(12) United States Patent
Kubajak et al.

(10) Patent No.: US 10,713,889 B2
(45) Date of Patent: *Jul. 14, 2020

(54) DEVICE, SYSTEM, AND METHOD FOR FACILITATING COMMUNICATIONS BETWEEN ELECTRONIC GAMING MACHINES AND MOBILE DEVICES

(71) Applicant: Japan Cash Machine Co., LTD., Osaka (JP)

(72) Inventors: David Kubajak, Las Vegas, NV (US); Dominic Mohrhardt, Las Vegas, NV (US)

(73) Assignee: Japan Cash Machine Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/777,733

(22) Filed: Jan. 30, 2020

(65) Prior Publication Data

US 2020/0168042 A1   May 28, 2020

Related U.S. Application Data

(63) Continuation of application No. 15/482,668, filed on Apr. 7, 2017, now Pat. No. 10,621,825.

(51) Int. Cl.
*G07F 17/32* (2006.01)
*H04W 4/80* (2018.01)
*H04W 76/14* (2018.01)

(52) U.S. Cl.
CPC ...... *G07F 17/3241* (2013.01); *G07F 17/3211* (2013.01); *G07F 17/3218* (2013.01); *G07F 17/3223* (2013.01); *G07F 17/3227* (2013.01); *G07F 17/3237* (2013.01); *G07F 17/3239* (2013.01); *G07F 17/3244* (2013.01); *H04W 4/80* (2018.02); *H04W 76/14* (2018.02)

(58) Field of Classification Search
CPC ............ G07F 17/3241; G07F 17/3223; G07F 17/3218; G07F 17/3211; G07F 17/3237; G07F 17/3227; H04W 4/80; H04W 76/14
See application file for complete search history.

(56) References Cited

U.S. PATENT DOCUMENTS 8,086,281 B2   12/2011   Rabu et al.
8,879,994 B2   11/2014   Brown et al.
(Continued)

FOREIGN PATENT DOCUMENTS

EP         2595123        5/2013
WO     WO 09/108820       9/2009

*Primary Examiner* — Kevin Y Kim
(74) *Attorney, Agent, or Firm* — Brownstein Hyatt Farber Schreck, LLP

(57) ABSTRACT

Various system, method, and device embodiments are disclosed for establishing and utilizing a wireless connection between an electronic gaming machine and a mobile device associated with a player. Such embodiments include use of a first component configured to communicate information with the mobile device using near-field communications and use of a second component configured to automatically pair the mobile device with the mobile interface device, using a Bluetooth connection, wherein the pairing of the mobile device with the mobile interface device utilizes the information communicated to the mobile device using the first component.

20 Claims, 9 Drawing Sheets

(56) References Cited

U.S. PATENT DOCUMENTS

| | | |
|---|---|---|
| 9,011,236 B2 | 4/2015 | Nelson et al. |
| 2003/0139180 A1 | 7/2003 | McIntosh et al. |
| 2006/0206833 A1 | 9/2006 | Capper et al. |
| 2008/0167088 A1* | 7/2008 | Rabu .................. H02J 7/0044 455/573 |
| 2008/0214300 A1 | 9/2008 | Williams et al. |
| 2012/0142403 A1 | 6/2012 | Prather et al. |
| 2012/0322384 A1* | 12/2012 | Zerr .................... H04W 76/10 455/41.3 |
| 2013/0065666 A1 | 3/2013 | Schueller et al. |
| 2013/0165210 A1* | 6/2013 | Nelson ............... G07F 17/3225 463/25 |
| 2015/0187177 A1 | 7/2015 | Warner et al. |
| 2015/0339654 A1 | 11/2015 | Warner et al. |
| 2016/0027252 A1 | 1/2016 | Warner et al. |
| 2016/0093166 A1 | 3/2016 | Panambur et al. |
| 2016/0283759 A1* | 9/2016 | Forster ................ G06K 7/0008 |
| 2017/0092054 A1 | 3/2017 | Petersen et al. |
| 2018/0293841 A1 | 10/2018 | Kubajak et al. |

\* cited by examiner

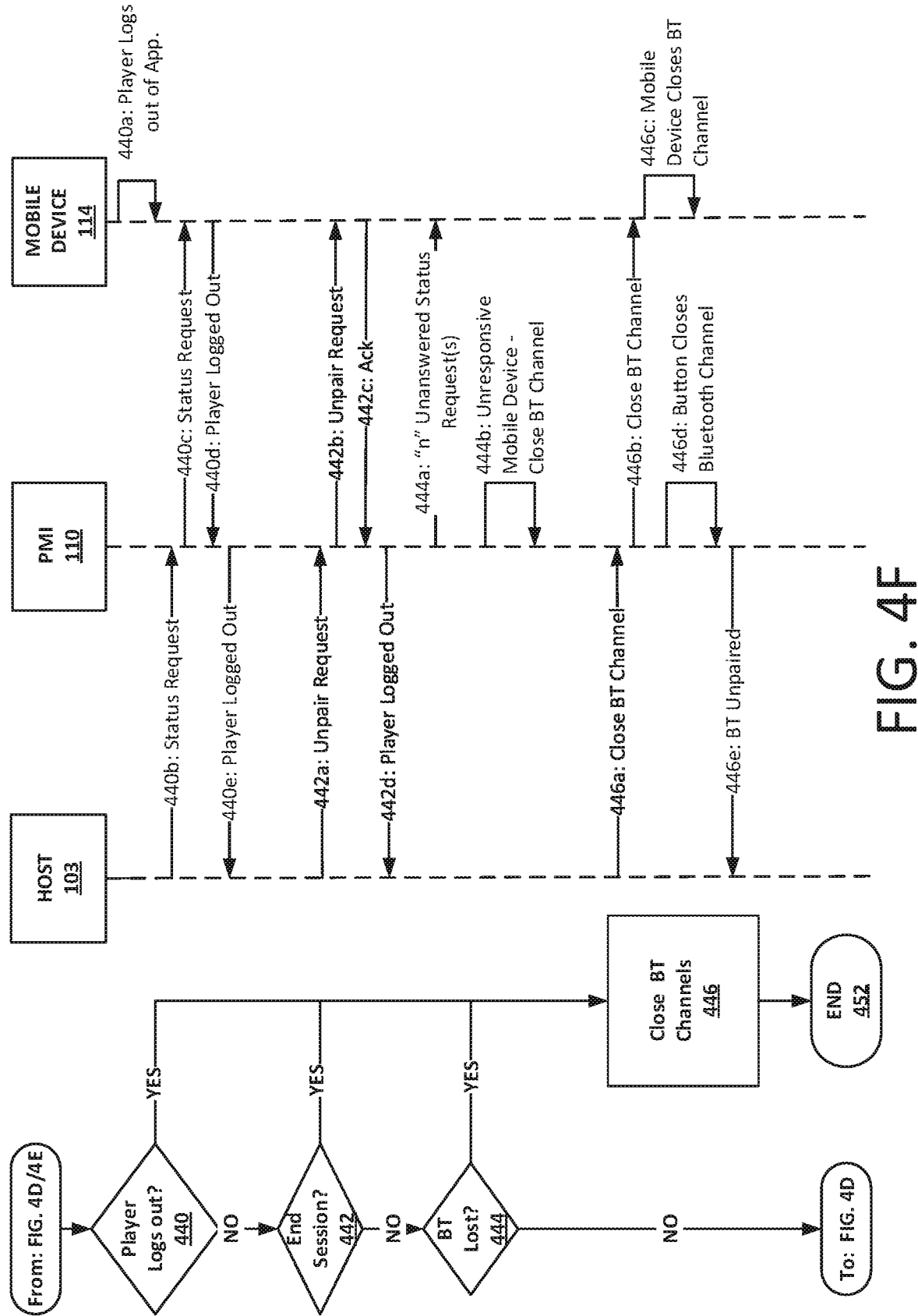

DEVICE, SYSTEM, AND METHOD FOR FACILITATING COMMUNICATIONS BETWEEN ELECTRONIC GAMING MACHINES AND MOBILE DEVICES

CROSS-REFERENCE TO RELATED APPLICATION

This application is a continuation of U.S. Nonprovisional patent application Ser. No. 15/482,668, filed Apr. 7, 2017, the contents of which are incorporated herein by reference as if fully disclosed herein.

FIELD

The technology described herein relates to devices, systems, and methods for use in identifying users ("players") of casino gaming systems and machines. The technology described herein also relates to devices, systems, and methods for use by players in accruing and redeeming promotional credits, points, and other forms of digital currencies in casino and related property environments. The technology described herein also relates to electronic transactions and/or information exchanges arising by and between players of casino gaming systems and related properties where the players use one or more personal technology devices, such as smart-phones, tablets, and other personal computing devices to participate in an electronic transaction and/or information exchange. The technology described herein also relates to the use of wireless communications systems, devices, and methods for securely exchanging digital data between casino players' mobile devices and electronic gaming machines.

BACKGROUND

The operations of casinos, gaming devices and gaming systems are typically tightly regulated by local, state and federal authorities. These regulations generally require a casino to maintain accurate records regarding every transaction that arises by, in, or through the casino and related properties. Casino operators are also required to maintain positive levels of control over all such transactions, to accurately identify players to such transactions, and to record each such transaction.

Casino operators commonly provide numerous devices on casino floors and elsewhere at which the operator needs to identify and authenticate players, and track transaction arising between the player and the casino. Examples of such devices include electronic gaming machines, point-of-sale terminals, and other devices and systems. More specifically, casino operators are commonly required to track transactions involving "cash" and its equivalents, where "cash" collectively herein refers to any form of financial consideration, such as currency bills issued by a governmental entity, bank credits, house credits, pre-paid accounts, such as those provided by PAYPAL™, and any other form of commonly recognized and transferable denominations of financial value.

To facilitate the tracking and auditing of such transactions and the transfers of cash by and between players and casino operators, casino operators often encourage players to utilize casino issued "cards," such as "ticket in, ticket out" (TITO) cards. A TITO card essentially identifies a player and associates a given point value with the player—the bearer of such card. The bearer may utilize known security techniques, such as pins and biometrics, to limit access and use of a TITO card. To use a TITO card, a player will typically fund an account associated with the TITO card by debiting one or more bearer accounts, such as a checking or savings account with a financial institution, or crediting one or more credit card or similar accounts. These debits and credits are electronically exchanged for casino "points" redeemable at the casino and associated properties. Points may be redeemed for practically any purpose, including wagering bets using a casino game, purchasing meals or other goods, attending shows, or other activities. "Points" may also be converted back into "cash" at the player's request. The exchange of "cash" for "points" and vice versa may occur at booths, at electronic gaming machines, betting tables, on-line, via mobile device software applications, or otherwise. Regardless of how such transactions occur, gaming regulations require a tracking of each "point" at each instance in a transactions flow including from the instance at which a point is generated (in exchange for cash), utilized (for example, with the playing of a slots game), and/or reconverted into cash or some other form of consideration provided to a player.

Typically, point tracking occurs across multiple casino computer systems and devices including, for example, master casino tracking systems, slot management systems, TITO management systems, point-of-sale systems, property management systems, such as those used for lodging, recreation and similar casino related operations, individual electronic gaming machines ("EGMs"), and otherwise. One or more of such systems and devices may utilize one or more actual or virtual servers to facilitate point tracking. In short, practically any device or system involved in the granting, redeeming, transfer, or use of a "point" is commonly required to track each "point" passing therethrough as well as the identity of the player acquiring, redeeming, or otherwise transferring such "points." Accordingly, these requirements impose a high layer of complexity on casino games, systems, and operators.

Further, the underlying game-play of casino gaming machines and systems are tightly regulated. Any change to certain hardware and/or software components of a gaming device often requires re-verification and re-approval by gaming regulators before players can use the game. The re-certification process can be lengthy and expensive. These regulatory and technical constraints often discourage casino system operators from changing the underlying game-play functionality or otherwise modifying casino games including EGMs. It is desirable for new functionality and hardware to be designed in such a manner as to be sufficiently insulated from those regulated components, and ideally to not require interaction with them at all. Additionally, gaming devices may be in operation for decades. It is therefore desirable for new features and functionality to be easily retrofitted to older gaming devices, some of which may not have been designed with modern technological capabilities in mind.

One approach for addressing these concerns has involved the use of interface boards, commonly known as Slot Machine Interface Boards ("SMIBs"). A SMIB commonly enables an EGM to communicate with one or more peripheral devices without the involvement of the game processor. These peripheral devices typically do not affect underlying game-play of an EGM, while providing additional incentives and features to players. For example, the rewarding of coupons, notifying players of promotions, or otherwise are often provided by peripheral devices interconnected to one or more EGMs by one or more SMIBs. A SMIB also may enable an EGM to communicate with other casino system servers and external servers over one or more networks, again without involving the game processor. Of course, other designs are known and available, some of which virtualize the function of a SMIB within a single EGM processor that incorporates both SMIB and gaming processes. Depending on the individual design, different approaches may be required to incorporate new functionality without requiring re-certification. Several examples are described in U.S. patent application Ser. No. 15/482,615, filed on Sep. 22, 2016, and entitled "Bill Validation and Cash Dispensing Device, System and Method for Use in a Casino Context" (the "'615 Application"), the entire contents of which are incorporated herein by reference.

The premium services described herein and in the '615 Application are typically provided through a window overlay (or picture-in-picture) on the gaming machine's display. While the premium services are greatly desirable to casino patrons, the window overlay method of using the services is sub-optimal. A patron's mobile phone would be a more convenient interface device to access the premium services, but casino regulations, as well as good business practice, require significant security provisions so that patrons and casinos are protected from theft and other malicious activity. Establishing a direct, authenticated, encrypted wireless communication session solves many of these problems. However, the lack of a quick, intuitive, and seamless means for a casino patron to create the secure session has previously made the mobile phone an unsuitable candidate for interfacing with premium services.

With the advent of smart-phones and similar personal computing devices (collectively, "mobile devices"), and the electronic wallet and mobile application features provided by such devices, players today often forego the use of physical credit cards, bank debit cards, identity cards, and access cards in non-casino gaming environments. That is, players often utilize their mobile devices and software applications and technologies provided therewith to engage in transactions. Such mobile devices often use close proximity communications technologies, such as optical character readers, Near-Field Communications ("NFC"), Bluetooth, and otherwise, to engage in such transactions while replacing physical cards. It is commonly known that NFC and Bluetooth are communications technology and a series of specifications provided, respectively, by the NFC Forum, Inc. and Bluetooth SIG, Inc. Such specifications and technologies are incorporated herein by reference.

Yet, despite this widespread use of mobile devices to engage in commerce and transactions in non-casino environments, today, no viable mechanism for complying with the regulatory and operational considerations facing casino operators has enabled the deployment of similar mobile device capabilities in a casino, gaming environment.

As such, a need exists in the casino industry for devices, systems, and methods which both enable players to utilize mobile devices to engage in various gaming transactions, such as the redeeming of cash or points in exchange for the opportunity to engage in a game of chance, while interfacing directly with an EGM. Desirably, the various embodiments of such needed devices, systems, and methods satisfying this long-lasting need are economically efficient in that they are compatible with both existing EGMs and with commonly used mobile device technologies, without requiring any fundamental changes in the operations of either.

SUMMARY

This summary is provided to introduce simplified concepts of devices, systems, and methods for establishing communications between electronic gaming machines and similar electronics devices and systems utilized by and/or in association with casino operators and mobile devices utilized by players and others and identifying such player to the casino operators' systems for authentication, tracking and other purposes.

An example embodiment may be a mobile interface device for establishing a wireless connection between an electronic gaming machine and a mobile device associated with a player. The mobile interface device includes a first component which communicates pairing information to the mobile device. A second component automatically pairs the mobile device with the mobile interface device using a Bluetooth connection. Pairing the mobile device with the mobile interface device uses the pairing information communicated to the mobile device by the first component.

In some examples, the pairing information includes an encryption key to establish secure data communications between the mobile interface device and the mobile device. The encryption key may be uniquely generated for each pairing of the mobile device with the mobile interface device. In some examples, the pairing information is communicated to the mobile device using near-field communications.

Another embodiment mobile interface device includes a first component which communicates pairing information to the mobile device using at least one optical image. A second component automatically pairs the mobile device with the mobile interface device using the optical image. The pairing of the mobile device with the mobile interface device uses the pairing information communicated to the mobile device using the optical image. The mobile interface device also includes a display which outputs in the optical image at least one code containing the pairing information designated for use by the mobile device to automatically establish a wireless connection between the mobile interface device and the mobile device.

Still another embodiment is a method for identifying a player to an electronic gaming machine using a mobile device. The method includes the operation of establishing a near-field communications link between the electronic gaming machine and the mobile device. The method further includes communicating, over the near-field communications link, information needed to pair the electronic gaming machine to the mobile device using Bluetooth. The method pairs the electronic gaming machine with the mobile device over a Bluetooth connection.

BRIEF DESCRIPTION OF THE DRAWINGS

The features, aspects, advantages, functions, components, devices, systems, and methods provided by the various embodiments of the present disclosure are further disclosed herein for at least one of the following descriptions and accompanying drawing figures.

FIGS. 4A-4F depict in a combined flow chart and a communications and operations diagram a method for utilizing Bluetooth and NFC connections to verify and authenticate a player's mobile device to a casino system and communicate information and data therebetween.

DETAILED DESCRIPTION

The various embodiments described herein are directed to devices, systems, and methods which facilitate an EGM's or a related system's identification, authentication and/or tracking of a player by use of a mobile device.

Figure 1:
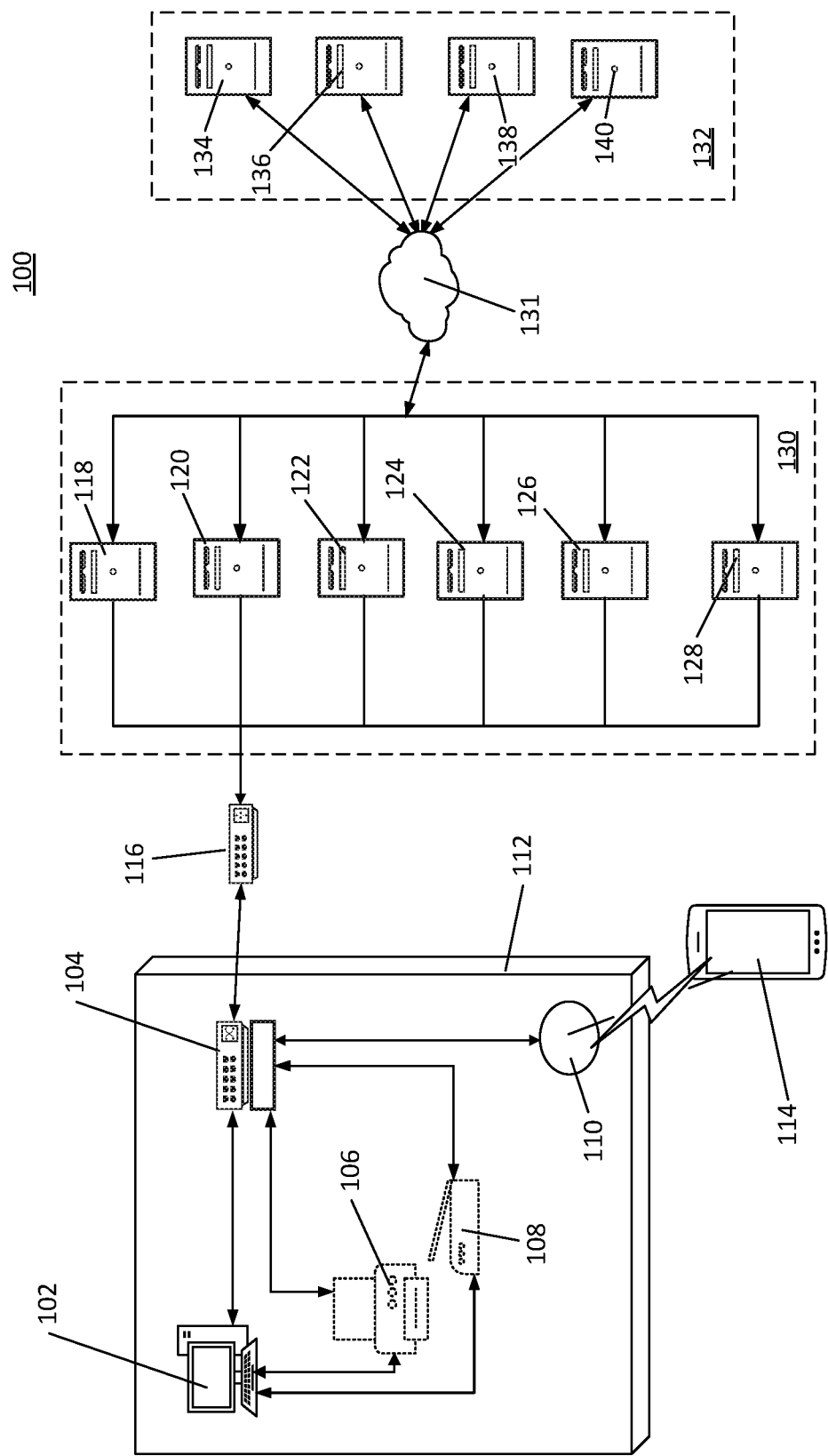
FIG. 1 is a schematic representation of a casino system configured for use in accordance with at least one embodiment of the present disclosure.

As shown in FIG. 1 and for at least one embodiment of the present disclosure, a system 100 disclosed herein includes an EGM 102 that is communicatively coupled to a peripheral controller 104 (such as a SMIB or similar device). The peripheral controller 104 may be communicatively coupled to one or more ancillary devices, such as a printer 106, a bill validator 108, or otherwise. The peripheral controller 104 is communicatively coupled to a mobile interface device 110 (a "MID"), which as discussed further below facilitates the identification, authentication, and tracking of the player while the player is "playing" the EGM 102. MID 110 may be configured to utilize any mobile device interconnection components, protocols, and technologies, such as Bluetooth™, WIFI, NCF, cellular, and other known and/or later to be discovered wire or wireless communications protocols, devices, and systems and otherwise. In at least one embodiment, MID 110 is configured for communicating, via one or more radio frequency protocols, data signals to and from a mobile device 114 using NCF and Bluetooth protocols. As discussed below, the mobile device 114 may be configured to identify and authenticate a player associated with the mobile device 114 to one or more servers provided in a casino system 130, such as a casino management system server 118. The mobile device 114 may be provided by a player, provided by the casino, or otherwise. The mobile device 114 may be any device configured to wirelessly identify and authenticate a player to the casino management system server 118. Examples of such mobile devices include but are not limited to smart-phones, smart-watches, and other personal mobile computing devices capable of communicating with an EGM over a wireless connection. In accordance with at least one embodiment and as discussed in greater detail below, such wireless connections are authenticated and secure.

In at least one embodiment, each of the EGM 102, peripheral controller 104, and MID 110 are provided in a single gaming cabinet 112. The printer 106 and bill validator 108 may also be provided, if desired, in the gaming cabinet 112, or separately, as desired for any given implementation of one or more of the present embodiments.

It is to be appreciated that the communications paths and/or linkages utilized to communicatively couple each of the EGM 102, peripheral controller 104, and MID 110 may utilize any desired medium, such as copper wire, printed circuit boards, optical cables, wireless pathways or otherwise. In at least one embodiment, universal serial bus (USB) compatible communication components are utilized to communicatively couple the peripheral controller 104 with the MID 110. In other embodiments, any known or hereafter developed communication components may be utilized to communicatively couple a MID 110 to any other component in a gaming cabinet 112. Further, in at least one embodiment, the communications components utilized to communicatively couple a printer 106, bill validator 108, or MID 110 to one or more of the EGM 102 and the peripheral controller 104 may utilize a single medium with the data signals communicated between such devices being separated, interleaved, addressed, or otherwise communicated. In short, any known or hereafter developed communications technologies may be used to communicatively couple one or more gaming cabinet 112 components with a second or more gaming cabinet 112 components. Such technologies may also be configured, as desired for any given embodiment, to facilitate the removal and replacement of any given component as such needs may arise, for example for repair, updating or otherwise. It is also to be appreciated that electrical power for one or more components provided in a gaming cabinet 112 may be provided, in whole or in part, by another component of such gaming cabinet 112. For example, a MID 110 communicatively connected to a peripheral controller 104 over a USB connection may rely upon power provided by the peripheral controller 104 via such USB connection. In other embodiments, power for a MID 110 may be provided thereto by any known or later arising technology. Any known or later developed communications protocols, such as USB 2.0 or other, may be used to facilitate communications between a MID 110, a peripheral controller 104 and one or more casino management system servers 118.

It is also to be appreciated that while depicted in FIG. 1 or elsewhere in conjunction with the various embodiments described herein, the components of gaming cabinet 112 may be provided internal or external to the cabinet and may exist as any desired combination of hardware and software elements. It is to be appreciated that certain of such hardware and/or software elements may exist virtually and may utilize hardware and software components that may be utilized by another of the gaming cabinet 112 components.

In accordance with at least one embodiment, MID 110 may be configured where the NFC antenna is a square helix design surrounding the MID's 110 display. Per such an embodiment, the MID 110 may resemble a "button" or similar device that is both familiar and easily understandable for casino patrons and can be installed into a gaming cabinet 112 through a suitably sized opening therein, with the MID 110 being plugged into a USB port provided on a peripheral controller 104.

Gaming cabinet 112 may be configured to include other components which are not shown in FIG. 1. Examples of such other components include but are not limited to TITO card readers, dispensers of items, such as beverage dispensers, user interface components, and otherwise. One or more of such other components may be configured to communicate with MID 110 directly or indirectly, for example, via a peripheral controller 104.

An EGM 102 may be configured to provide any desired gaming experience to a player. For example, in one embodiment EGM 102 may be a slot machine, a video poker game, or any other gaming experience. In one embodiment, a gaming table and a dealer may replace the EGM 102. In at least one embodiment, a gaming cabinet 112 may provide the option for non-regulated experiences, with an EGM or other component providing various types of non-gambling user interfaces, such as video games for minors and otherwise. It is to be appreciated that the various embodiments described may be utilized in conjunction with such non-gambling and gambling implementations. Accordingly, an EGM 102 can provide any type of player desired interactive experience, both regulated or non-regulated. An EGM 102 may include any desired hardware and software components needed to provide the desired gaming or other interactive experience. The types of gaming and other experiences and the technical capabilities of an EGM 102 to provide such experiences are beyond the scope of the present disclosure.

Peripheral controller 104 may be configured to operate as a smart device with respect to one more components of the gaming cabinet 112, wherein the peripheral controller 104 itself executes one or more software/logical programs or controls needed by one or more of the MID 110 or other component of the gaming cabinet 112. Peripheral controller 104 may also be configured to directly or indirectly control the operations of any application program executing on a player's mobile device 114, when such mobile device 114 is communicatively coupled to the MID 110.

When configured in accordance with at least one embodiment of the present disclosure as a smart device, the peripheral controller 104 may be configured to be communicatively coupled, directly or indirectly to the Fuzion system 128, as described in the '615 Application, such that the peripheral controller 104 has direct access to the various premium features of the system 100. In furtherance of such a system configuration, the peripheral controller 104 may be configured with one or more drivers and/or application program interfaces which enable the Fuzion system 128, via the peripheral controller 104 and the MID 110, to control one or more features and functions of the mobile device 114, including for example, the information, features and functions provided by an application program executing on such mobile device 114.

In at least one embodiment, the MID 110 may be configured to instruct a mobile device 114 to present a link to a mobile application provided by an online store, such as the Android PLAY store provided by GOOGLE. Upon selection of such a link, a mobile application program associated with the casino operator may be automatically, semi-automatically (i.e., requiring some user interaction) or manually downloaded, installed, and selected for execution on the mobile device. The MID 110 may also be configured to instruct a mobile device 114 to execute a mobile payment option, such as ANDROID PAY, SAMSUNG PAY, APPLE PAY, or other. The use of NFC and execution of such mobile payment systems is well-known in the art and is beyond the scope of the present disclosure.

In another embodiment, peripheral controller 104 may be configured to operate as a pass-through type device with respect to one or more components of the gaming cabinet 112, wherein the peripheral controller 104 essentially acts as a router or hub by which communications by and between a MID 110 are routed and directed to other system 100 components, such as a casino management system server 118 or other casino system 130 components.

When configured in accordance with at least one embodiment of the present disclosure as a pass-through device, peripheral controller 104 may be configured to enable, for example, the Fuzion system 128 to communicate with and control the operation of the MID 110 and a mobile device 114 communicatively coupled to the MID 110. As configured as a pass-through device, the peripheral controller 104 may be further configured to pass data messages between the Fuzion system 128 and the MID 110 to the player's mobile device 114.

In yet another embodiment, the peripheral controller 104 may not physically exist in a gaming cabinet 112. Instead, one more other gaming cabinet 112 components, such as an EGM 102 or a MID 110, may provide such various features and functions. It is also to be appreciated that the hardware and/or software providing the features and functions of the peripheral controller 104 in either of the smart-device and/or pass-through device configurations may be provided in other casino system 130 components, for example, as a virtual machine operating on a casino management system server 118.

It is to be appreciated that a casino system may include two or more gaming cabinets 112, with peripheral controllers 104 in each of such gaming cabinets using different modes of operation. For example, a first peripheral controller 104 may utilize a smart-device mode of operation, while a second peripheral controller 104 utilizes a pass-through mode of operation. Further, a peripheral controller 104 may be configured to change its mode of operation based upon mobile device type utilized, transaction requested, or otherwise. For example, a peripheral controller 104 may use the smart device mode when a mobile device is NFC compatible and a pass-through mode when the mobile device is not NFC compatible.

MID 110 may be configured to operate in accordance with one or more system protocols. Such protocols may be configured, for example, to govern when a MID 110 can and cannot be utilized. A MID 110 may be configured to identify and authenticate a player's mobile device 114 by the presence of any desired form of electronic identification or other provisioning of data. By way of illustration only and not by means of limitation, examples of such electronic identification forms may include NFC generated signals, Wi-Fi signals, Bluetooth signals, other known communications technologies, and optical images such as two-dimensional bar codes, QR codes, and otherwise. In at least one embodiment, MID 110 may be configured to receive other forms information provided on "tickets" or "tags" such as a player's signature, a code or other identifier provided by a player using, for example, a touch screen compatible user interface on a mobile device 114 or otherwise. A MID 110 may be configured to include optical character generation capabilities, pattern generation capabilities and other forms of signal and character generation technologies. In accordance with at least one embodiment, MID 110 may be provided in conjunction with a bill validator 108 or a printer 106. Per at least one embodiment, the system may be configured to utilize a printer 106, bill validator 108, a display provided by an EGM 102 or other device capable of generating a QR code readable by a player's mobile device 114. The so generated QR code may be printed, e.g., as a ticket, or displayed on a display. The QR code may be utilized to provide a mobile device 114 with information sufficient to pair such mobile device 114 with a given MID 110 for a given session. Accordingly, it is to be appreciated that for at least one embodiment of the present disclosure, a MID 110 may be configured but does not have to be configured, for any given session or otherwise, to possess or utilize NFC communications capabilities to pair a MID 110 with a given player's mobile device 114.

A unique identifier may identify a MID 110. Examples of identifiers include, but are not limited to, network addresses, device addresses, media access control ("MAC") addresses, serial numbers, unique sequences of numbers, by a grouping of two or more MIDs 110 in a casino system, or otherwise. For at least one embodiment, a MID 110 may be identified by a MAC address provided with an NFC transceiver utilized. It is to be appreciated that such MAC address may be unique for each session based upon an encryption code being passed by a MID 110 to a mobile device 114 for any given session. A MID 110 may be configured to accumulate, monitor, and provide various metrics regarding MID 110 usage including, for example, usage data, device health, status, and other parameters that may be desired by a casino operator, regulators, players, or any combination of the preceding.

Peripheral controller 104 may be communicatively coupled to a first network 116. In accordance with at least one embodiment, the first network 116 may be utilized exclusively by the casino such that it is physically and/or logically closed to outside systems and intruders. One or more firewalls and closed/restricted data ports, or other approaches may be used to restrict access to such casino system 130 components. The first network 116 may utilize any known or later arising networking technology. The first network 116 may include and utilize local area networks, wide area networks, the Internet, or any other communications configuration, topologies, mediums, protocols, and technologies.

The first network 116 communicatively interconnects one or more servers, databases, devices, and/or systems utilized by a casino for its operations, accounting, reporting, marketing, management, sales, and other purposes. Examples of such servers include casino management system server 118, slot management system 120, TITO system 122, property management system 124, point of sale system 126, and Fuzion system 128. Such systems are described in greater detail in the '615 Application.

It is to be appreciated that the storage and/or communication of data by and between any of the components of system 100 may be encrypted. Any desired single or combination of encryption technologies may be utilized by system 100 components, including but not limited to the use of secure socket layers, virtual private networking, public/private keys, 128-bit, 256-bit and other encryption algorithms, or other known or later arising encryption algorithms, techniques and technologies. For at least one embodiment, upon authentication of a player's mobile device by the casino, communications between the MID 110 and a player's mobile device 114 are encrypted. Such communications may be further communicated, in clear or encrypted form, between a MID 110 and, via a peripheral controller 104, one or more casino system 130 servers.

It is also to be appreciated that in accordance with at least one embodiment any two or more of the networked system components, such as casino management system server 118 and Fuzion server 128, may be logically, physically, virtually, directly, or indirectly communicatively coupled to a MID 110. Such communications couplings may include the use of one or more application program interfaces (APIs), such that API calls between any two system 100 components may be utilized to authorize, access, control or otherwise manage one or more features or functions provided by the system 100 and components thereof.

As further shown in FIG. 1, for at least one embodiment, the system 100 may include the use of one or more second networks 131. Such second networks 131 may utilize any desired data communication technologies, protocols, mediums, and topologies. In accordance with at least one embodiment, the second network 131 is the Internet. The second network 131 may be configured to communicatively connect the casino system 130 with one or more third party systems, as represented by one or more third party servers, for example, lottery server 134, pari-mutuel server 136, marketing server 138, and fantasy sports server 140. It is to be appreciated that the services provided by one or more of such third-party systems 132 and servers may be provided as a premium feature to a player. For at least one embodiment, such third-party systems 132 and servers may be accessible to a player using a mobile device 114 communicatively coupled to a MID 110.

Figure 2:
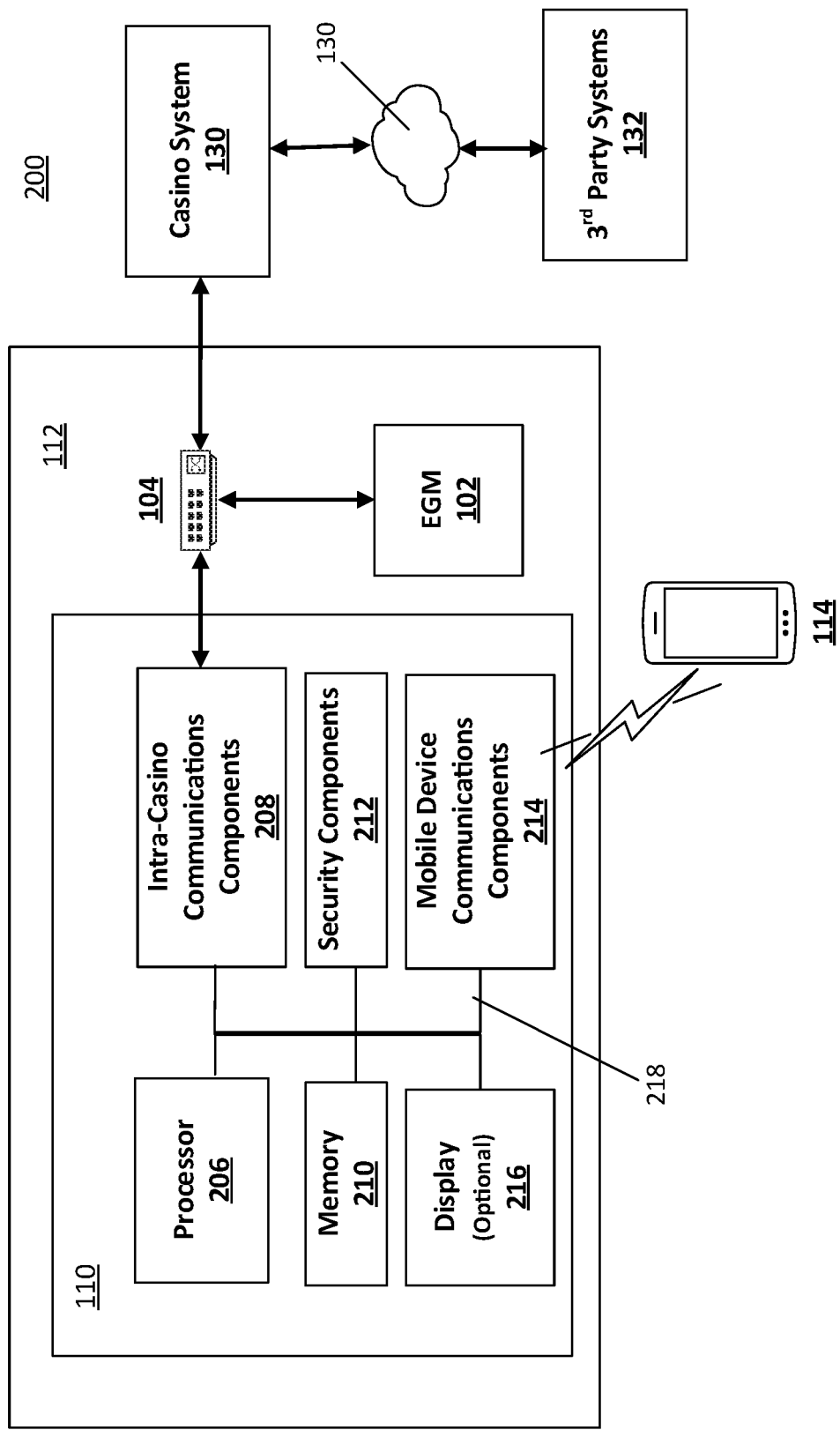
FIG. 2 is schematic representation of a player mobile interface configured for use in a gaming cabinet and for wirelessly communicating with a mobile device in accordance with at least one embodiment of the present disclosure.

As shown in FIG. 2 with respect to at least one embodiment of the present disclosure, a system 200 configured for use with a MID 110 may include a peripheral controller 104, an EGM 102, a casino system 130, a player's mobile device 114 and a MID 110 configured to facilitate the identification and communication of information signals by and between the player's mobile device 114 and one or more components of the casino system 130. As depicted in FIG. 2, the MID 110 components are depicted in accordance with the functions provided by the MID 110. It is to be appreciated that such functionalities may be provided by suitably configured digital signal processors and like components as a system on a chip, by separate physical components, or combinations thereof. More specifically, for at least one embodiment, a MID 110 may be configured to include a digital signal processor 206. The digital signal processor 206 may be any form of microcontroller configurable for use in digital signal processing, MAC address processing, device control, and related functions. In accordance with at least one embodiment, the processor 206 may be an ARM Cortex-M4 type or comparable processor.

The MID 110 may also be configured to include one or more intra-casino communications components 208. As discussed above with respect to at least one embodiment of the present disclosure, the MID 110 may be communicatively coupled to the peripheral controller 104 using one or more known wired and/or wireless communications technologies, such as USB, LAN, WIFI, Ethernet, and otherwise. For at least one embodiment, the intra-casino communications components 208 include a USB interface board having at least one USB port configured for connecting to a MID 110 via a USB cable. Other types of communications interfaces, board, ports, connectors, and the like may be utilized for a given embodiment to communicatively couple the MID 110, directly or indirectly, to a peripheral controller 104 and/or to one or more other system 200 components. When provided as a separate device, the intra-casino communications components 208 may be communicatively coupled to the processor 206 by a suitably sized MID bus 218.

The MID 110 may be configured to include one or more memory components 210. Such memory components 210 may be any form of memory, sized appropriately for any given implementation of any embodiment of the present disclosure. The memory 210 may be configured with any desired level of (non)volatility, including for example, random access memory (RAM), read only memory (ROM), erasable read only memory (EPROM), flash memory, or otherwise. The memory 210 may be partitioned or otherwise separated or provided as desired. For example, MID 110 device firmware may be stored in ROM, while transient instructions are stored in a flash or other form of cache memory. Memory 210 may be communicatively coupled to the MID bus 218.

The MID 110 may also be configured to include one or more security components 212. The security components 212 may be configured to facilitate any desired level of data protection during storage, transmission, usage, or otherwise. For at least one embodiment, data transmissions between a MID 110, a player's mobile device 114, a peripheral controller 104, and/or a casino system management server 118, is encrypted using 128 bit AES encryption. Other and/or additional data security technologies may be used. For example, 256 bit AES level encryption may be utilized for storage or transmission of data by and between any system 200 components.

The MID 110 may be configured to include one or more mobile device communications components 214. In one embodiment, such mobile device communications components 214 may be configured to facilitate connectivity between a MID 110 and a mobile device 114 using both NFC and Bluetooth technologies. In accordance with at least one embodiment, the mobile device communications components 214 may be configured to transmit Bluetooth signals to a mobile device 114 using any desired Bluetooth class power levels. For one embodiment, the Bluetooth power levels utilized provide an operating range of up to 10 meters over which a reliable connection between a MID 110 and a mobile device 114 may be maintained. In other embodiments, higher or lower power Bluetooth power classes including classes 1 to 4 may be utilized to provide a desired operating range. In other embodiments, the operating range provided by and between a MID 110 and a mobile device 114 may vary with environmental and other conditions, such as, the presence of noise, signal interference, security concerns, and otherwise.

It is commonly appreciated that establishing Bluetooth connections between a first and a second device commonly requires invocation of an inquiry or a discovery process in each of the devices seeking to connect. The inquiry or discovery process provides a mechanism by which each device may authenticate itself to the other device. Often, Bluetooth inquiry and discovery processes inhibit the seamless and fast connecting of one device with another, such as a player's mobile device 114 with a MID 110, while often requiring operator input. For at least these reasons, Bluetooth only approaches are labor intensive and undesirable to many casino operators.

In the past few years, the NFC Forum and the Bluetooth SIG have developed protocols for using NFC to automatically authenticate and securely connect a first Bluetooth configured device with a second Bluetooth configured device. Accordingly, for at least one embodiment, the mobile device communications components 214 of the MID 110 may be configured to include NFC capabilities. Such NFC capabilities commonly include an NFC compatible antenna, transceiver, data cache and other well-known components. These and other NFC communications components are well known in the art and are not further described herein. The mobile device communications components 214 may be further configured to utilize any known or later developed NFC to Bluetooth hand-over protocols. Per such protocols and for at least one embodiment, the mobile device communications components 214 may be configured to automatically, for example, upon a "touching" of a mobile device to a designated area on a gaming cabinet 112 bearing an NFC logo or similar designator, identify the MID 110 to the player's mobile device 114, launch an application program on the player's mobile device 114, and authenticate the player's mobile device 114 to the MID 110, and hand over the communications to a Bluetooth component provided by each of the MID 110 and the mobile device 114. Such procedures may also include exchanging one or more encryption keys, MAC addresses and other information utilized to facilitate secure Bluetooth communications between the MID 110 and the player's mobile device 114. For at least one embodiment, Bluetooth communications then proceed between the MID 110 and the player's mobile device 114 until the Bluetooth connection is terminated. It is to be appreciated that a Bluetooth connection may terminate based upon the moving of a mobile device 114 beyond the Bluetooth range of either the MID 110 or the mobile device 114 or upon a termination of the link by either component. The system 200 may be configured to periodically re-authenticate the mobile device 114 to the MID 110, exchange new encryption keys or proceed as otherwise desired by a casino operator to maintain secure communications between a MID 110 and a player's mobile device 114.

Notably, a player's mobile device 114 may not be configured with NFC capabilities, while having Bluetooth capabilities. Accordingly, for at least one embodiment, a player may be provided with a "tag" that can be used to authenticate the player to a MID 110 using NFC. For example, a tag may be attached to or provided in a hotel room key provided by the casino to the player. Such tag may be programmed to include information needed to authenticate the player's mobile device 114 to a MID 110 over NFC and for use in establishing connections between the MID 110 and the mobile device 114 using Bluetooth components provided respectively by each of the MID 110 and the player's mobile device 114.

Alternatively, for at least one embodiment, authentication of a player's mobile device 114 may be accomplished by using optical character recognition capabilities provided by camera equipped smart-phones and like devices. Such so equipped mobile devices may be configured to read and interpret QR codes and similar encoded optical images. Such QR and like codes provide the information needed to identify a given MID 110 and instruct a mobile device 114 reading the same to automatically discover and connect, over Bluetooth, with the given MID 110. For at least one embodiment, the MID 110 may be optionally configured to include a display 216 configured to optically present such a QR or like code. The QR code presented by a MID 110 may be configured to be readable by a mobile device satisfying certain optical character recognition capabilities. The displayed QR code need not necessarily be humanly readable or recognizable. The QR code presented on the display 216 provides the information necessary for the mobile device 114 to discover the MID 110 and establish a secure Bluetooth connection therebetween. In one embodiment, a generic QR code reading software application may be utilized on the player's mobile device 114. In another embodiment, the QR code reading functionality may be integrated into a software application associated with the casino or otherwise and launched on the player's mobile device 114. In at least one embodiment, the software application may be launched automatically upon detection of the QR code, upon entrance of the mobile device into the casino, for example, based on location information, or otherwise. The QR code generated may be a static code, providing connection information only, or a dynamic code, providing both connection and encryption information. Static QR codes may be utilized for more than one Bluetooth connection (each a "BT session") between a MID 110 and a mobile device 114. Dynamic QR codes are unique to each BT session. In at least one embodiment, QR codes may be generated by any device and in any desired format, such as a ticket, on a display device, or otherwise.

Figure 3B:
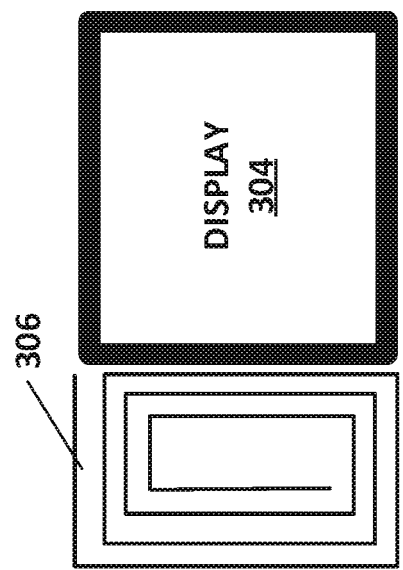
FIGS. 3A and 3Bs are pictorial representations of an antenna and display structure for use with a player mobile interface in accordance with at least one embodiment of the present disclosure.
Figure 3A:
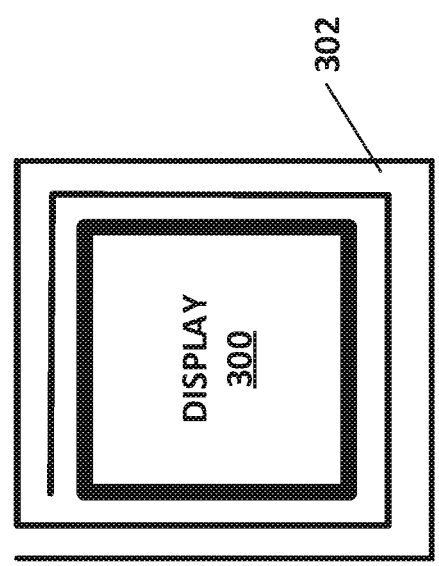

As shown in FIGS. 3A and 3B, for at least one embodiment, the MID 110 may be configured to provide the before mentioned optical image generation capabilities as well as the NFC capabilities by including a display 300/304 and a NFC antenna 302/306. As shown in FIG. 3A for at least one embodiment, the arms of the NFC antenna 302 array may have a square helix form that is positioned around a perimeter of the display 300. As shown in FIG. 3B, the arms of the NFC antenna 306 array may be positioned in a square helix form proximate to the perimeter of the display 300/304. For at least one embodiment, displays 300 and 304 are configured to be 1"×1" or less in size to present a QR or like image readable by a camera of a mobile device 114 positioned less than 4 inches from the display's 300/304 surfaces. The displays 300/304 may also be configured to inhibit and/or prevent the reading of the presented QR codes by a mobile device not positioned substantially above the display 300/304 surface, where "substantially above" means the optical character reading device on a mobile device is positioned within 45 degrees of an axis extending perpendicularly from the axial plane on which the display surface of the display 300/304 resides.

As discussed above, one or more embodiments of the present disclosure may not include or use NFC communications capabilities to pair a MID 110 with a player's mobile device 114. For such non-NFC embodiments, it is to be appreciated that one or more of the operations set forth per FIGS. 4A to 4F are unnecessary as the establishment of a Bluetooth connection between a MID 110 and a player's mobile device 114 may occur once the information needed to automatically pair the MID 110 with the player's mobile device 114 is communicated to the player's mobile device 114. As discussed above, such pairing information may be communicated in any form, by any compatible device.

Referring now to FIGS. 4A-4F, for at least one embodiment a method is shown for utilizing Bluetooth and NFC connections to verify and authenticate a player's mobile device to a casino system and communicate information and data therebetween. In FIGS. 4A-4F, a communications and operations diagram is also provided which depicts at least one embodiment of the communications and operations that may arise between a host 103, such as a peripheral controller 104 or one or more servers in casino system 130 communicatively coupled to a peripheral controller 104, a MID 110, and a player's mobile device 114. It is to be appreciated that additional, less, alternative, and/or other steps and/or communications may arise between the devices of system 100. It is also to be appreciated, that various communications between devices are not shown for purposes of simplicity. Examples of communications not shown include the sending of status requests, such as those that may be sent between communicatively coupled devices on random, periodic, or another basis, acknowledgement messages, replies, and otherwise.

Figure 4A:
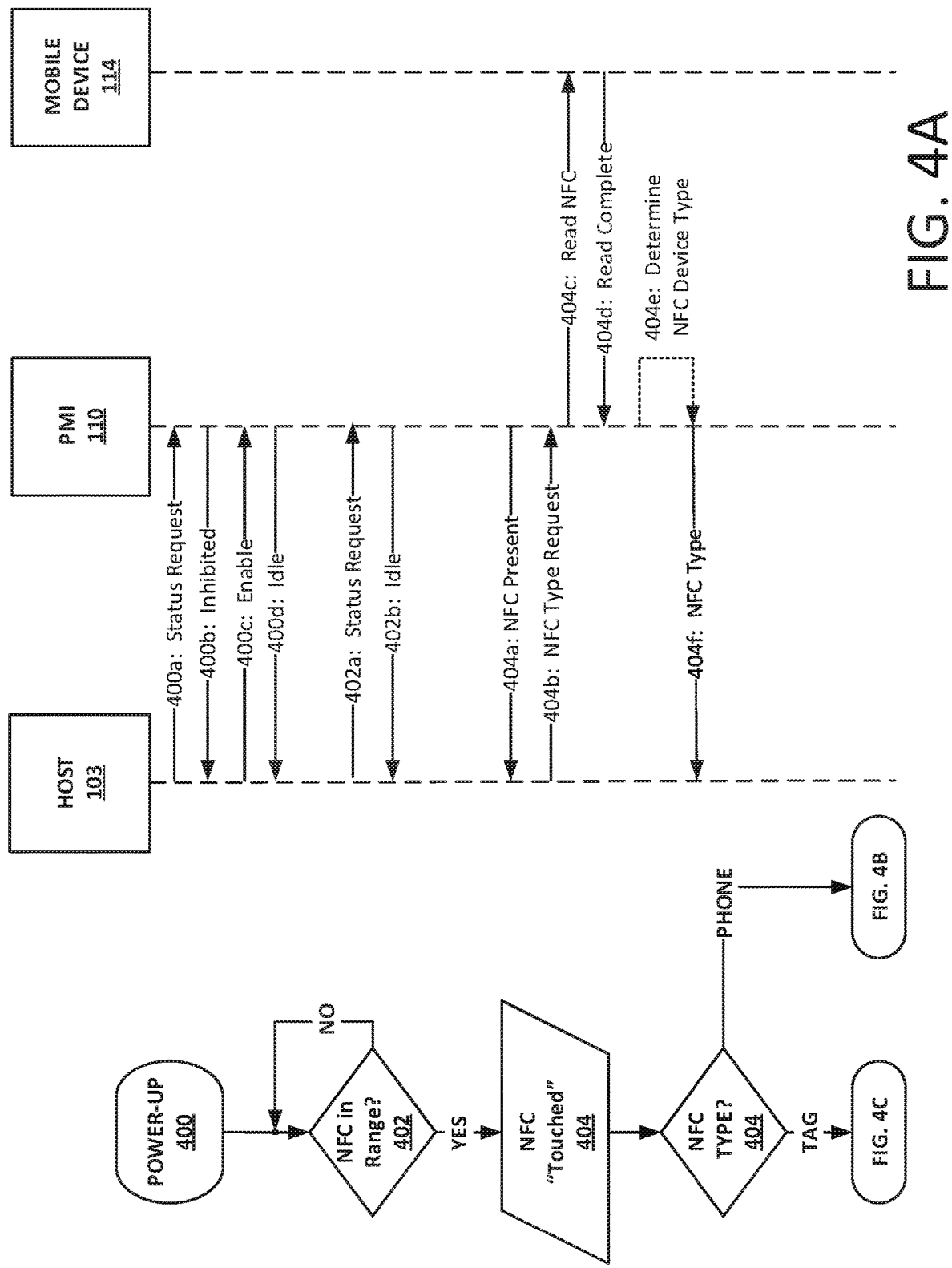

As shown in FIG. 4A, one embodiment of a method per the present disclosure may begin when an EGM 102 is first configured, or "powered-up" for use with a mobile device 114 (Operation 400). It is to be appreciated that any given EGM 102 may in a "powered" or unpowered state, with regards to the ability to interact with a player's mobile device 114, at any given time and for any given reason or lack thereof. As shown, when an EGM 102 is powered-up, a host 103 may be configured to communicate one or more status request messages (Operation 400a) to a MID 110. The format of such messages may be any desired but, for at least one embodiment, may include elements suitable for synchronizing messages, sending commands, specifying a length of a given message, which may be expressed in bytes or otherwise, providing for error correction, encryption, data, and other message components. The sending of status request messages may occur with or without polling. Likewise, any device connected to the system may send status request messages including, but not limited to, the host 103, MID 110, and mobile device 114. Status request messages may also be sent upon the occurrence, or lack thereof, of any given event. For example, the activation of a MID 110, such as by the placement of a NCF equipped mobile device 114 within range of a MID's 110 NFC antenna may trigger the sending of a status request message from the MID 110 to the host 103. In accordance with at least one embodiment, a device receiving a status request message should respond within 50 milliseconds with an acknowledgement message or other suitable reply. The system may also be configured to resend a message when a response to a previously sent message is not timely received. A message may be sent one or more successive times, as desired for any given embodiment. Per at least one embodiment, such resending of a message may occur 100 milliseconds after a previously sent message to which a suitable reply is not received. The system may be configured to consider status request messages not receiving a timely response to be indicative of system malfunction, a player moving away from the EGM, and otherwise.

As further shown in FIG. 4A, a MID 110 may be configured to inhibit its NFC capabilities. When such a state exists, the MID 110 may reply to a status request message with an "inhibited" signal (Operation 400b). As discussed above, a peripheral controller 104 may control the operating state of the MID 110 directly or indirectly, such as when in pass-through mode and a server in the casino system 130 operates as the "host" 103. Accordingly, FIG. 4A depicts that a host 103 may command a MID 110 to be enabled, such as by sending an Enable message (Operation 400c). A MID 110 may be enabled for any given time, such as until a disable command is sent, for a period, or otherwise. When in an "enabled" state, a MID 110 listens for an NFC message from a mobile device 114 or a tag. When in an "idle" state, a MID 110 may communicate an Idle message (Operation 400d), indicating that the MID 110 is ready to pair with a mobile device but no such pairing is presently occurring.

When a mobile device 114 moves within range of a MID 110 and the player using such mobile device desires to utilize Bluetooth connections between the mobile device 114 and the MID 110 (Operation 402), the player "touches" the mobile device 114 or a tag to the MID 110. As used herein, a "touch" of a mobile device 114 and/or tag to a MID 110 may occur physically, such as by the physical pushing of a button or other user interface provided by a MID 110, an EGM 102, a bill validator 108, or other component of a gaming cabinet 112, or electromagnetically, such as by the passing of the mobile device 114 or tag within an electromagnetic field emitting from a MID 110. The emitting of electromagnetic fields in NFC and other frequencies is well-known in the art and is not described herein. When the "touch occurs" (Operation 404), the MID 110 may be configured to communicate an "NFC Present" message or a similar message to the host 103 (Operation 404a). Such message may convey any desired quantity or type of information, and for at least one embodiment communicates that an NFC compatible device is within range.

As further shown in FIG. 4A, upon receiving an NFC Present message, a host 103 may be configured to respond with an NFC Type Request message (Operation 404b). As discussed above, a system may be configured to pair with mobile devices that do not have NFC capabilities. Accordingly, an NFC Type Request message may be utilized to inquire as to whether the mobile device 114 within range of the MID 110 is NFC capable. In one embodiment, information needed to automatically pair, over Bluetooth, a mobile device not NFC capable with a MID 110 may include the use of an NFC tag. Such NFC tag may be provided, for example, on a room key, a TITO ticket or otherwise. For at least one embodiment, information provided by an NFC tag may be accessed by the MID 110, a bill validator 108, or otherwise. An NFC tag may be an active or passive NFC device, or any other device which conveys information needed to automatically establish a Bluetooth connection by and between the MID 110 and the player's mobile device 114. For at least one embodiment, an NFC Type Request message (Operation 404b) may instruct a MID 110 to read the NFC information being presented by the use of a NFC capable mobile device or a tag. The information presented may be read and determined by the MID 110, the host 103, another gaming cabinet 112, or any combination thereof using any known or later arising technology (Operations 404c-404d-404e). As shown for the embodiment depicted in FIGS. 4A-4F, two possible sources of NFC information are available, the Phone/Mobile device itself or an NFC tag. The method continues with FIG. 4B or 4C depending on the NFC type of device detected.

Figure 4B:
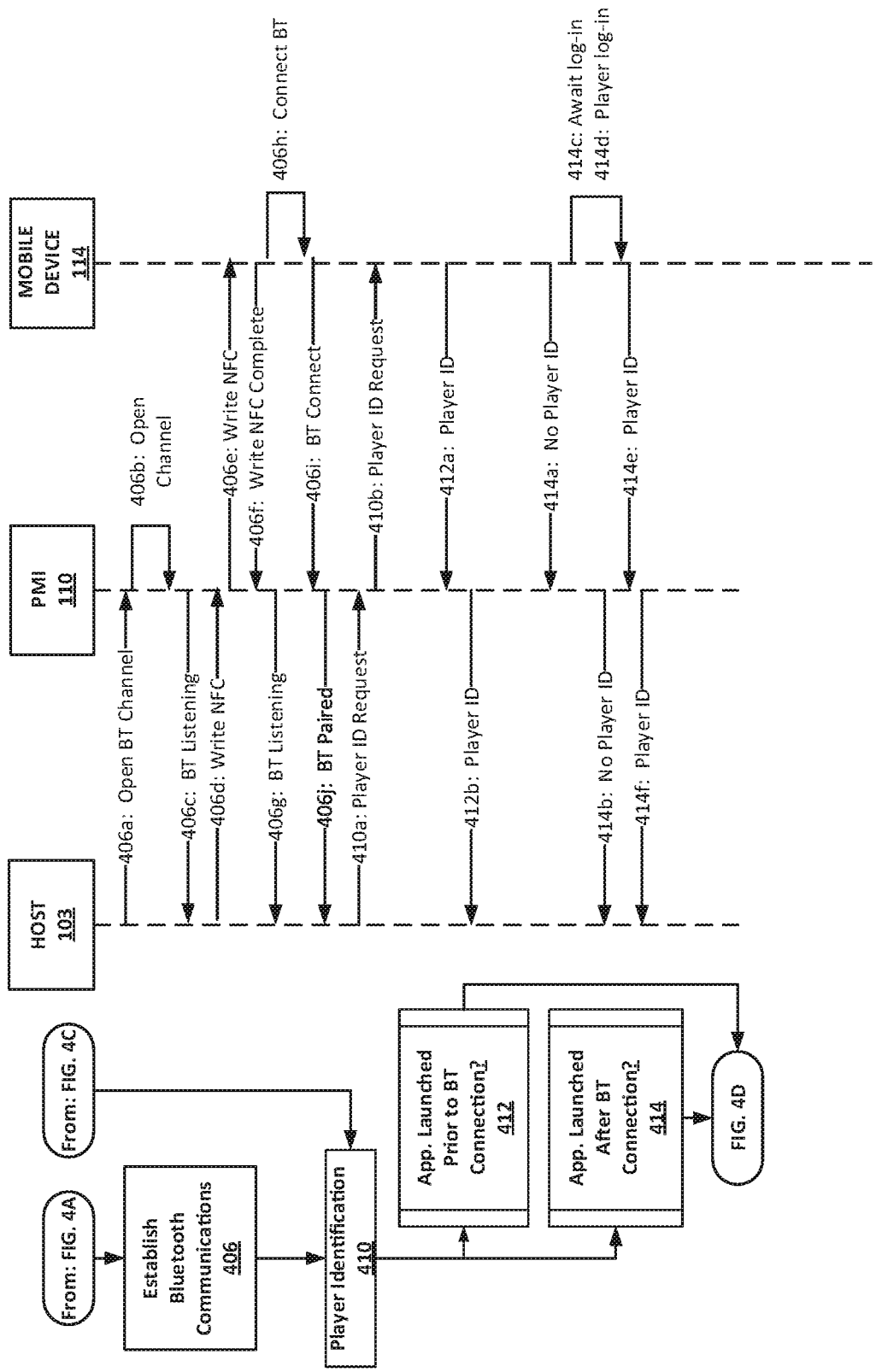

When the mobile device is NFC compatible, the method continues in FIG. 4B with automatically establishing Bluetooth communications between the MID 110 and the mobile device 114 (Operation 406). For one embodiment, the establishing of Bluetooth communications may include the operations of Opening the Bluetooth ("BT") Channel (Operations 406a-406j) on the MID 110. Per one embodiment, the MID 110 may be configured to open a Bluetooth channel only upon instruction from a host (Operation 406a-406b). In other embodiments, the MID 110 may be configured to open a Bluetooth channel whenever a "touch" occurs. The host 103 may be configured to wait and/or "listen" until an acknowledgement is received from a MID 110 that a Bluetooth channel has been opened. (Operation 406c).

The opening of the Bluetooth channel may include the generation of session unique, common, or other information (Operation 406d). For example, a random number might be assigned to the Bluetooth connection. Such random number may be used to determine an encryption key to utilize to secure communications between the MID 110 and the mobile device 114 over Bluetooth. Likewise, the opening of a Bluetooth channel may occur in the "clear," where only those security protections provided by Bluetooth protocols are utilized, or "securely," where one or more additional, casino system operator, security measures may be utilized, such as encryption. Per at least one embodiment, each establishment of a session between a MID 110 and a mobile device 114 occurs uniquely, such that a new encryption key may be utilized to secure communications. Alternatively, the same encryption key may be utilized to secure communications between a MID 110 and a mobile device 114 for two or more sessions. Such configuration information is communicated to the mobile device (Operation 406e) and the mobile device 114 may be configured to use the information provided by the MID 110 to establish the Bluetooth connection (Operation 406h). It is to be appreciated, however, that per at least one other embodiment, the communication flow may be the opposite and the mobile device 114 may be the source of the information used to establish the Bluetooth connection with the MID 110.

Upon processing the information needed to establish the Bluetooth connection, the mobile device 114 may send a BT Connect or similar message to the MID 110 (Operation 406i). The MID 110 may also communicate a BT Paired or similar message to the host 103 (Operation 406j).

Figure 4C:
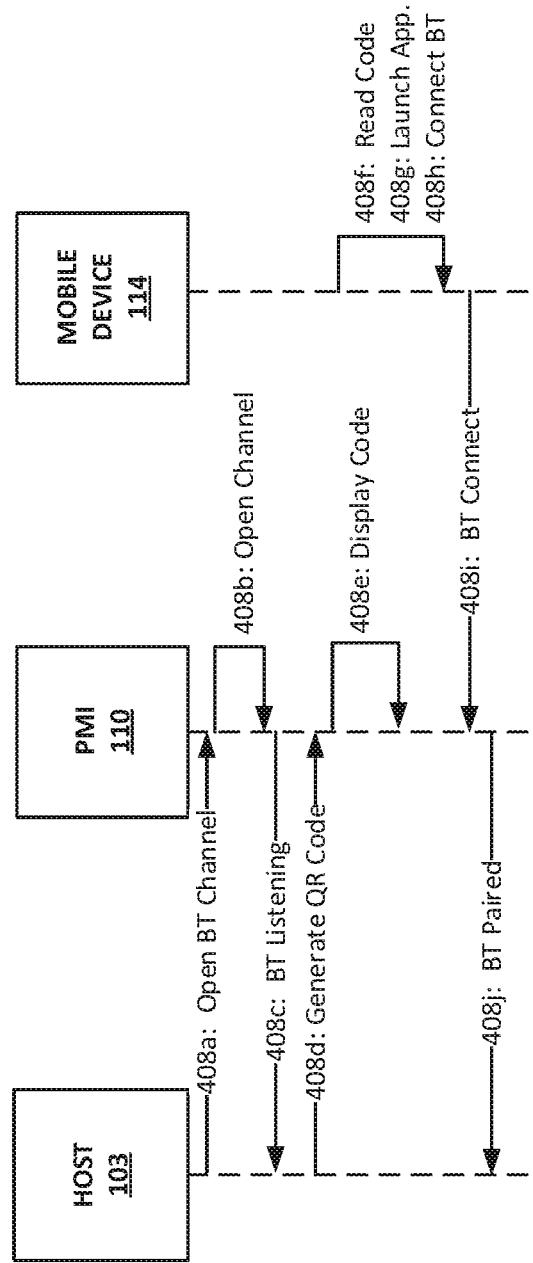

In FIG. 4C, the method of establishing a Bluetooth connection using a tag or other non-NFC compatible mobile device is shown. Per the method shown in FIG. 4C, the method may include the operation of the host instructing the MID 110 to open its Bluetooth channel (Operation 408a). Such instruction may be needed, for example, when the tag's information is obtained from the player using a validator or other device. Per Operation 408b-408c, the MID 110 opens its Bluetooth channel and communicates such status back to the host 103. When the MID 110 or other component of the gaming cabinet 112 contains a display, printer 106 or other compatible device, the host 103 may be configured to then generate and communicate a QR code (Operation 408d) for display by the MID 110 (Operation 408e), EGM 102, printer 106, or other device. When such QR code is present, the mobile device 114 reads the code and takes appropriate actions (Operation 408f). Per one embodiment, such appropriate actions may include launching a mobile application on the mobile device 114 (Operation 408g) or taking other actions needed to connect the mobile device 114 to the MID 110 via Bluetooth (Operation 408h). It is to be appreciated that the information communicated via the QR code to the mobile device 114 may include the same information communicated per Operations 406d-406e. Additional information may be communicated in either approach, as desired for a given embodiment. Per Operations 408i-408j, BT Connect and BT Paired messages may then be communicated to the MID 110 and host 103, respectively.

Referring again to FIG. 4B, once a mobile device is connected to the MID over Bluetooth, the method may continue for at least one embodiment with player identification (Operation 410). Player identification may initiate upon request by a host 103, such as a casino system's 130 player management system seeking the same. A player ID request message may be suitably communicated from any server in casino system 130, the EGM 102, the peripheral controller 104, or otherwise to the mobile device 114 (Operations 410a-410b). The mobile device 114 suitably responds with the requested information, with such information being provided to the requesting host 103 (Operations 412a-412b). It is to be appreciated that the requested player identification information may include any information desired by a casino system or device to verify, authenticate, or otherwise identify a player. It is to be appreciated that an embodiment may arise where a player's identification is not available upon request (Operations 414a-414b). For example, a player may be new to or not registered with the casino. The method may be configured to permit establishing a Bluetooth connection before a player "logs-in" or otherwise identifies themselves. (Operations 412-414). Accordingly, the method may be configured to await, when necessary, a player logging into a mobile application, into the EGM 102 or otherwise identifying themselves to the casino system 130 (Operations 414c-414f). Per at least one embodiment, the method then continues with one or more of the operations shown in FIGS. 4D-4F. It is to be appreciated, however, that player identification may occur at any time during the method shown in FIGS. 4A-4F and/or any other processes used per one or more embodiments of the present disclosure.

Figure 4D:
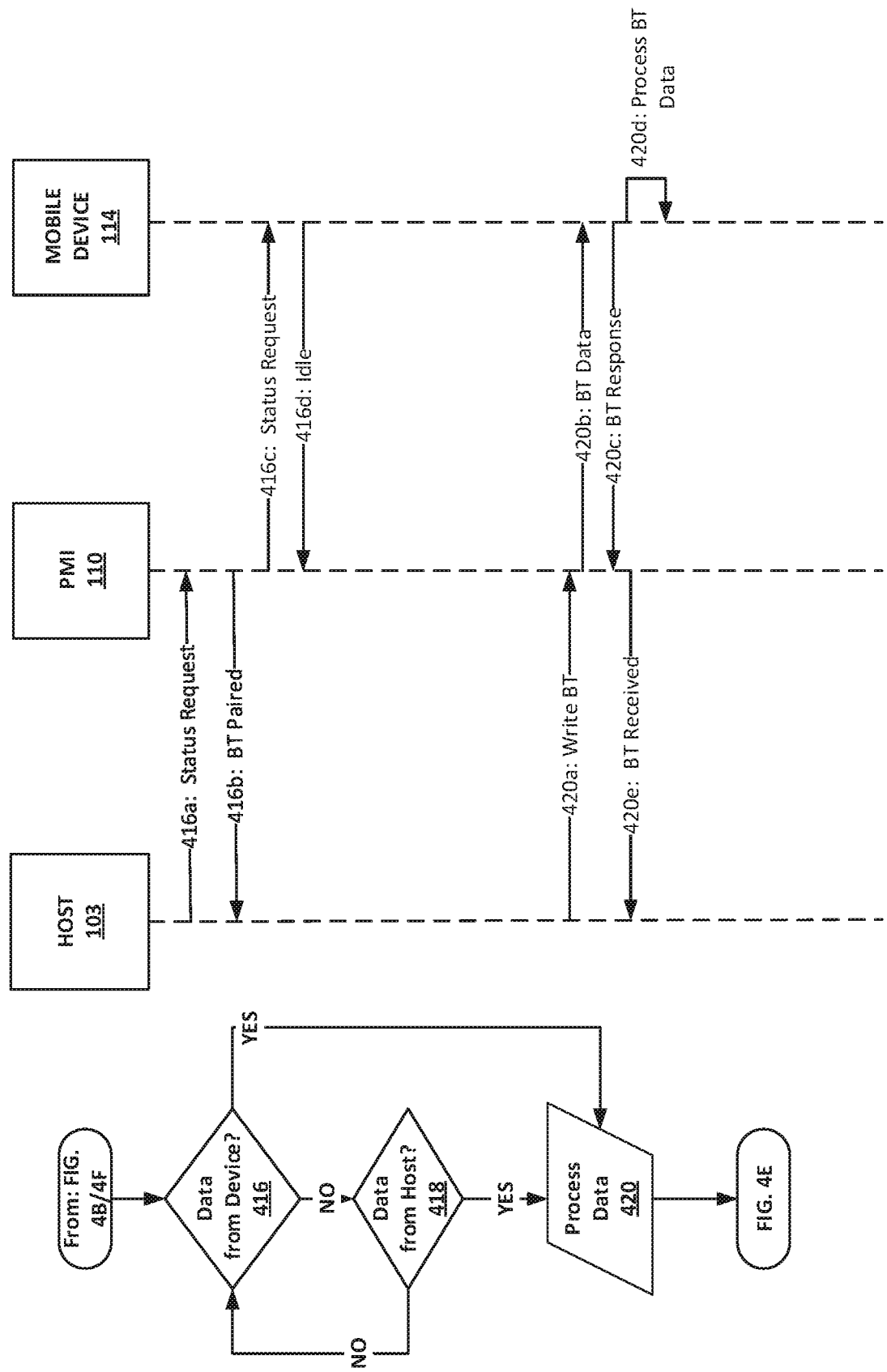

As shown in FIG. 4D, the method may include operations for determining whether data is to be communicated to or from a mobile device (Operations 416 and 418). For at least one embodiment, the processing of such data (Operations 420 and 420a-e) may proceed with data being sent by a host to a mobile device, with acknowledgement messages being returned. For at least one embodiment, such processes may proceed as per FIG. 4E. It is to be appreciated that one method for determining whether a mobile device 114 has data to provide to the host is to periodically send a status request message from the host to the mobile device via the MID (Operations 416a). As shown, a response by the MID 110 to such a status request may include confirming that the Bluetooth session is active (Operation 416b). Similarly, the MID 110 may periodically confirm the Bluetooth connection is still active by sending a Status Request or similar message to the mobile device (Operation 416c). The mobile device may be configured to respond with an Idle message (Operation 416d) when it does not have other data to provide. When the mobile device has data to provide, the method may proceed as per FIG. 4E.

Figure 4E:
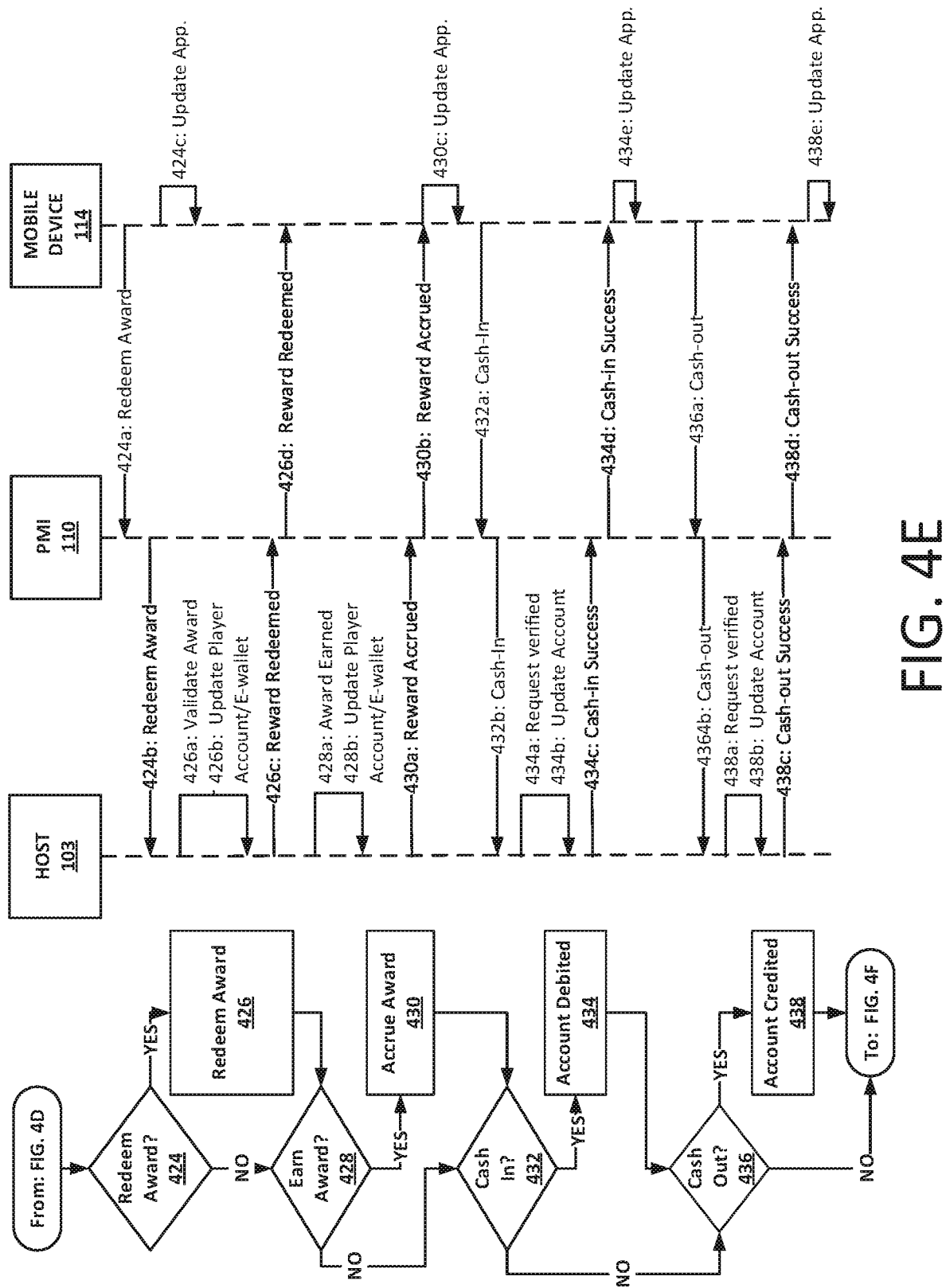

As shown in FIG. 4E, a mobile device may provide various types of data 114 to the host and vice versa. For example, a mobile device may provide data seeking to redeem an award (Operations 424-426). Per one embodiment, a mobile device may initiate a redeem award method by communicating a Redeem Award message to the host via the MID 110 (Operations 424a-b). Upon receiving such request, the host may be configured to validate the award and, when valid, update the player's account (which may be an E-wallet or other account) (Operations 426a-b). The host may be configured to communicate a Reward Redeemed message to the mobile device, via the MID 110 (Operations 426c-426d).

Similarly, a host 103 may desire to notify a mobile device when an award has been earned (Operation 428) and accrue such award to an account associated with the player (Operation 430). More specifically, for at least one embodiment, a host may be configured to recognize when an award is earned (Operation 428a). Such earning event may arise, for example, from favorable game-play such as a successful wager, from random awards, or otherwise. When an award is earned, a host may be configured to automatically update a player's account, E-wallet, or other account (Operation 428b). While not shown in FIG. 4E, an embodiment may be configured to verify a player desires to receive the award before any account is updated. Further, when an award is earned and accounts are updated, the host may be configured to communicate information, Reward Accrued messages, to the mobile device which enables the mobile device to update an application executing thereon. (Operations 430a-c).

As further shown in FIG. 4E, another type of event a mobile device may originate may include a "Cash-in" event (Operation 432). As inferred, a Cash-in event may arise when a player desires to provide additional "cash" into his/her account to enable additional game-play. Without regard to the form of cash provided, such as bank-notes, credit or debit card charges, or otherwise, the mobile device 114 may be configured to communicate the cash-in event to the host 103 by one or more Cash-In messages (Operations 432a-b). Per at least one embodiment, these messages may occur in conjunction with a player's use of a bill validator 108. Upon receiving the messages and the "cash" (however denominated) the host 103 may be configured to verify the request, update the appropriate account(s) and communicate a success message to the mobile device 114 (Operations 434a-d). The mobile device 114 may be configured to update its applications upon receipt of a success message (Operation 434e).

A cash-out method may also be supported (Operations 436-438). Per a cash-out method, a player desiring to convert points into cash may initiate such method using their mobile device 114 by sending one or more Cash-out messages to a host 103 (Operations 436a-b). The host 103 may be configured to verify the request and update accounts accordingly (Operations 438a-b). It is to be appreciated that the accounts may be updated directly, such as by electronic funds transfers or otherwise, indirectly, such as by updating a TITO ticket, or otherwise. Cash-out success messages may be communicated from a host 103 to the mobile device 114 (Operations 438c-d), with the mobile device 114 accordingly updating one or more application programs and/or accounts (Operation 438e). These and other processes may continue until the session ends.

As shown in FIG. 4F, the Bluetooth connection (the session) may terminate when a player logs-out (Operation 440). For example, a player may terminate the session by logging out of the application program executing on their mobile device 114 (Operation 440a). The system may be configured for at least one embodiment to determine that the user has logged out based upon a corresponding message sent by the mobile device 114 in response to a periodic Status Request message (Operations 440b-e). Similarly, a Bluetooth connection may be terminated when the host 103 desires to end the session (Operation 442). For example, if a player is not actively using an EGM for some period, the host 103 may be configured to send an Unpair Request message to the mobile device 114 (Operation 442a-c). An acknowledgement or a lapsing of time may result in the session being designated for termination (Operations 442c-d). Likewise, the connection may be lost for other reasons, such as interference, a player's mobile device 114 moving away from the gaming cabinet 112 or otherwise. The MID 110 may detect these types of events without the involvement of the host 103 and may be configured to send one or more unanswered Status Request messages to the mobile device 114 (Operation 444a). For at least one embodiment, after three Status Request messages are not answered by a mobile device 114, the connection may be deemed lost and designated for closure by the MID 110 and/or the host 103 (Operation 444b).

As shown in FIG. 4F, for at least one embodiment, once a session has been designated for closure, the closing method originates with the host 103 instructing the MID 110 to close the channel (Operations 446a-c). For other embodiments, the closing may be initiated by the MID 110 directly or by the mobile device 114. As further shown in FIG. 4F, for at least one embodiment, the closing method proceeds with the mobile device 114 closing its Bluetooth channel first (Operation 446c) and then the MID 110 closing the Bluetooth channel (Operation 446d) and informing the host 103 that the Bluetooth channel is closed and the mobile device 114 is unpaired (Operation 446e) from the MID 110. In other embodiments, the closing of the channel by the mobile device 114 or the MID 110 may occur simultaneously, or in any desired order. Upon the closing of the Bluetooth channel and the unpairing of the mobile device 114 with the MID 110, the operations of FIG. 4A may continue.

Further and in accordance with at least one embodiment, it is to be appreciated that the application program executing on a mobile device 114 that has been communicatively coupled to an EGM 102 via, at least in part, a MIB 110 may be configured to present to a player any desired user interface(s) and support any desired form or function of player interactions. More specifically, the various embodiments described herein may be configured such that a mobile device 114 may be configured to support, directly or indirectly, one or more premium features. Examples of such premium features are described in the '615 Application. In accordance with at least one embodiment, premium features may be provided as one or more overlay(s), pictures, windows, panels, panes or otherwise presented on a display (collectively and individually, an "overlay") associated with an EGM 102. Such overlay(s) may be provided by an EGM's 102 display, a display on the mobile device 114 communicatively thereto coupled in accordance with an embodiment of the present disclosure or otherwise.

Likewise, user input and output functionalities associated with such premium features may be supported and/or provided by use of a mobile device 114 communicatively coupled to an EGM 102 per at least one embodiment of the present disclosure. For example, a so connected mobile device 114 may provide user character or other input capabilities that might not otherwise be supported by an EGM 102. Data output capabilities might also be supported, such as the providing of tax forms (e.g., W-2G forms) in electronic format to the player's mobile device versus printing such forms on a printer 106. The providing of such sensitive information to a player must accordingly occur over a secure connection established per at least one embodiment of the present disclosure. Accordingly, it is to be appreciated that at least one embodiment of the present disclosure may be configured to support the providing of premium features to players using mobile devices 114 communicatively coupled to an EGM 102.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a computer. The above specification, examples and data provide a complete description of the structure and use of the various embodiments of the invention as defined in the claims.

Although various embodiments of the claimed invention have been described above with a certain degree of particularity, or regarding one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of certain embodiments and not limiting. Changes in detail or structure may be made without departing from the basic elements of the invention as defined in the following claims.

What is claimed is:

1. A system for facilitating communications between an electronic gaming machine and a mobile device, comprising:
  a data connection configured to communicably couple to a peripheral controller connected to the electronic gaming machine;
  a presentation component configured to be retrofitted to a gaming cabinet that includes the electronic gaming machine and to communicate session initialization information to the mobile device via a machine readable optical code; and
  a mobile interface device configured to be retrofitted to the gaming cabinet that includes the electronic gaming machine and to establish a communication session with the mobile device via a communication connection in response to the mobile device initializing the communication connection using the session initialization information from the machine readable optical code, the mobile interface device configured to receive power from the peripheral controller via the data connection; wherein:
  the mobile interface device is configured to identify and authenticate a player, via the data connection, based on data transmitted by the mobile device to the mobile interface device across the communication connection.

2. The system of claim 1, wherein the communication connection comprises at least one of a WiFi connection or a cellular connection.

3. The system of claim 1, wherein the session initialization information includes a unique identifier associated with the mobile interface device.

4. The system of claim 2, wherein:
  the session initialization information includes an encryption key; and
  the encryption key is configured for use in securing data communicated between the mobile interface device and the mobile device via the communication connection.

5. The system of claim 4, wherein the encryption key is uniquely generated for each of multiple communication sessions between the mobile device and the mobile interface device.

6. The system of claim 1, wherein the machine readable optical code comprises a QR code.

7. The system of claim 1, wherein the presentation component comprises a display device that displays the machine readable optical code.

8. The system of claim 1, wherein the machine readable optical code is printed on a physical component.

9. The system of claim 1, wherein the presentation component comprises a printer that prints the machine readable optical code.

10. A system for facilitating communications between an electronic gaming machine and a mobile device, comprising:
  a presentation component configured to be retrofitted to a gaming cabinet that includes the electronic gaming machine and to communicate session initialization information to the mobile device via a machine readable optical code; and
  a mobile interface device configured to be retrofitted to the gaming cabinet that includes the electronic gaming machine and to establish a communication session with the mobile device via a communication connection in response to the mobile device initializing the communication connection using the session initialization information from the machine readable optical code; wherein:
  the mobile interface device is configured to identify and authenticate a player, via a data connection configured to communicably couple to a peripheral controller connected to the electronic gaming machine, based on data transmitted by the mobile device to the mobile interface device across the communication connection;
  the mobile interface device is configured to receive power from the peripheral controller via the data connection; and
  the communication connection comprises at least one of a WiFi connection or a cellular connection.

11. The system of claim 10, wherein the machine readable optical code comprises an optical image.

12. The system of claim 10, wherein the mobile interface device is operable to communicate with a bill validator that is communicably connected to the electronic gaming machine.

13. The system of claim 12, wherein the mobile interface device is operable to communicate with the bill validator via the peripheral controller.

14. The system of claim 10, wherein the presentation component comprises a bill validator.

15. A system for facilitating communications between an electronic gaming machine and a mobile device, comprising:
- a mobile interface device configured to:
  - be retrofitted to a gaming cabinet that includes the electronic gaming machine;
  - establish a communication session with the mobile device via a communication connection in response to the mobile device initializing the communication connection using session initialization information communicated by a presentation component, the presentation component configured to be retrofitted to the gaming cabinet that includes the electronic gaming machine, via a machine readable optical code, the communication connection comprising at least one of a WiFi connection or a cellular connection;
  - identify and authenticate a player, via a data connection configured to communicably couple to a peripheral controller connected to the electronic gaming machine, based on data transmitted by the mobile device to the mobile interface device across the communication connection; and
  - receive power from the peripheral controller via the data connection.

16. The system of claim 15, wherein the mobile interface device is configured to communicate via an Ethernet network.

17. The system of claim 15, wherein the mobile interface device is configured to identify the player to a casino management system.

18. The system of claim 17, wherein the casino management system is communicably coupled to the peripheral controller.

19. The system of claim 17, wherein the mobile interface device identifies the player to the casino management system after at least one application program configured to use with the casino management system is launched on the mobile device.

20. The system of claim 19, wherein the at least one application program is configured to perform at least one operation of redeeming an award, cashing-in, or cashing-out.

* * * * *